United States Patent
Ichikawa et al.

(10) Patent No.: US 6,710,940 B2
(45) Date of Patent: Mar. 23, 2004

(54) PASSENGER COMPARTMENT MONITORING APPARATUS

(75) Inventors: Takashi Ichikawa, Aichi (JP); Toshiyuki Isogai, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 23 days.

(21) Appl. No.: 10/255,548

(22) Filed: Sep. 26, 2002

(65) Prior Publication Data

US 2003/0058545 A1 Mar. 27, 2003

(30) Foreign Application Priority Data

Sep. 27, 2001 (JP) ......................................... 2001-298329

(51) Int. Cl.[7] ......................... G02B 5/08; G02B 17/182; G02B 17/00
(52) U.S. Cl. ........................ 359/726; 359/838; 359/872
(58) Field of Search ................................. 359/602–604, 359/613, 630–632, 838, 841–844, 872–876, 726

(56) References Cited

U.S. PATENT DOCUMENTS 6,447,128 B1 * 9/2002 Lang et al. .................. 359/872
2002/0196565 A1 * 12/2002 Shuen ........................ 359/872

FOREIGN PATENT DOCUMENTS

| JP | 6-12199 U | 2/1994 |
| JP | 2000-264128 | 9/2000 |
| JP | 2001-122163 | 5/2001 |

* cited by examiner

Primary Examiner—Georgia Epps
Assistant Examiner—Alicia M. Harrington
(74) Attorney, Agent, or Firm—Crompton, Seager & Tufte, LLC

(57) ABSTRACT

A passenger compartment monitoring apparatus that guarantees the required monitoring area and can be installed in both right-hand and left-hand drive vehicles. The monitoring apparatus has a room mirror arranged in the passenger compartment and a plurality of imaging devices arranged in the room mirror. Each of the imaging devices is arranged in the room mirror at a predetermined angle so as to monitor a predetermined area in the passenger compartment regardless of whether the monitoring apparatus is installed in a right-hand or left-hand drive vehicle.

16 Claims, 3 Drawing Sheets

PASSENGER COMPARTMENT MONITORING APPARATUS

BACKGROUND OF THE INVENTION

The present invention relate to a passenger compartment monitoring apparatus, and more particularly to a monitoring apparatus that can be installed in both right-hand and left-hand drive vehicles to optimally monitor a passenger compartment of the vehicle.

A passenger compartment monitoring apparatus that prevents the operation of an air bag device under certain conditions is know in the art. The monitoring apparatus includes a CCD camera and a computer that are arranged in the passenger compartment. The computer analyzes images of the passenger compartment that are taken by the CCD camera and prohibits operation of the air bag device under certain conditions based on the analysis result. For example, in a passenger compartment monitoring apparatus disclosed in Japanese Laid-Open Patent Publication No. 2000-264128, since the CCD camera is arranged in a passenger compartment that is limited in space, a reflection mirror of a room mirror is used as a half mirror. The CCD camera is incorporated between the half mirror and a case. The half mirror is used to view a passenger seat. For example, when a child seat is mounted on the passenger seat, the operation of an air bag device is prohibited under certain conditions.

However, in the passenger compartment monitoring apparatus of JP2000-264128, the CCD camera is capable of monitoring the passenger seat of only a right-hand drive vehicle or only a left-hand vehicle. The imaging area of the CCD camera installed in a right-hand drive vehicle differs from that of the steering wheel installed in a left-hand vehicle. Therefore, two types of monitoring apparatuses must be manufactured, one for right-hand drive vehicles and another for left-hand drive vehicles. Thus, it takes time to manufacture the passenger compartment monitoring apparatuses.

SUMMARY OF THE INVENTION

It is an object of the present invention to provide a passenger compartment monitoring apparatus that obtains the necessary monitoring area regardless of whether the monitoring apparatus is installed in a right-hand drive vehicle or a left-hand vehicle.

To achieve the above object, the present invention provides a passenger compartment monitoring apparatus including a room mirror arranged in a passenger compartment. A plurality of imaging devices are arranged in the room mirror. Each of the imaging devices is arranged at a predetermined angle with respect to the room mirror so as to monitor a predetermined area of the passenger compartment when arranged in either one of a right-hand drive vehicle or a left-hand drive vehicle.

A further perspective of the present invention is a passenger compartment monitoring apparatus including a rotatable room mirror arranged in a passenger compartment. First and second imaging devices are arranged on the room mirror. The first imaging device has a first horizontal angle of view and a first vertical angle of view and the second imaging device has a second horizontal angle of view and a second vertical angle of view. When the room mirror is arranged so that a normal line with respect to the room mirror lies on a horizontal plane of the vehicle, the first imaging device has a first horizontal mounting angle formed by a first horizontal projection optical axis that is obtained by projecting an optical axis of the first imaging device on the horizontal plane and a horizontal reference line that is vertical to the normal line on the horizontal plane. The first horizontal mounting angle is set based on the first horizontal angle of view and a rotation angle of the room mirror that faces a driver seat. The second imaging device has a second horizontal mounting angle formed by a second horizontal projection optical axis obtained by projecting an optical axis of the second imaging device on the horizontal plane and the horizontal reference line and the horizontal mounting angle is set based on the second horizontal angle of view and the rotation angle. The first imaging device has a first vertical mounting angle formed by a first vertical projection optical axis obtained by projecting the optical axis on the vertical plane and a vertical reference line that is vertical to the normal line on the vertical plane. The first vertical mounting angle is set based on the first vertical angle of view. The second imaging device has a second vertical mounting angle formed by a second vertical projection optical axis obtained by projecting the optical axis on the vertical plane and the vertical reference line. The second vertical mounting angle is set based on the second vertical angle of view. The first and second horizontal angle of views are set so that imaging areas of the first and second imaging devices are overlapped with each other at a predetermined distance from the room mirror.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
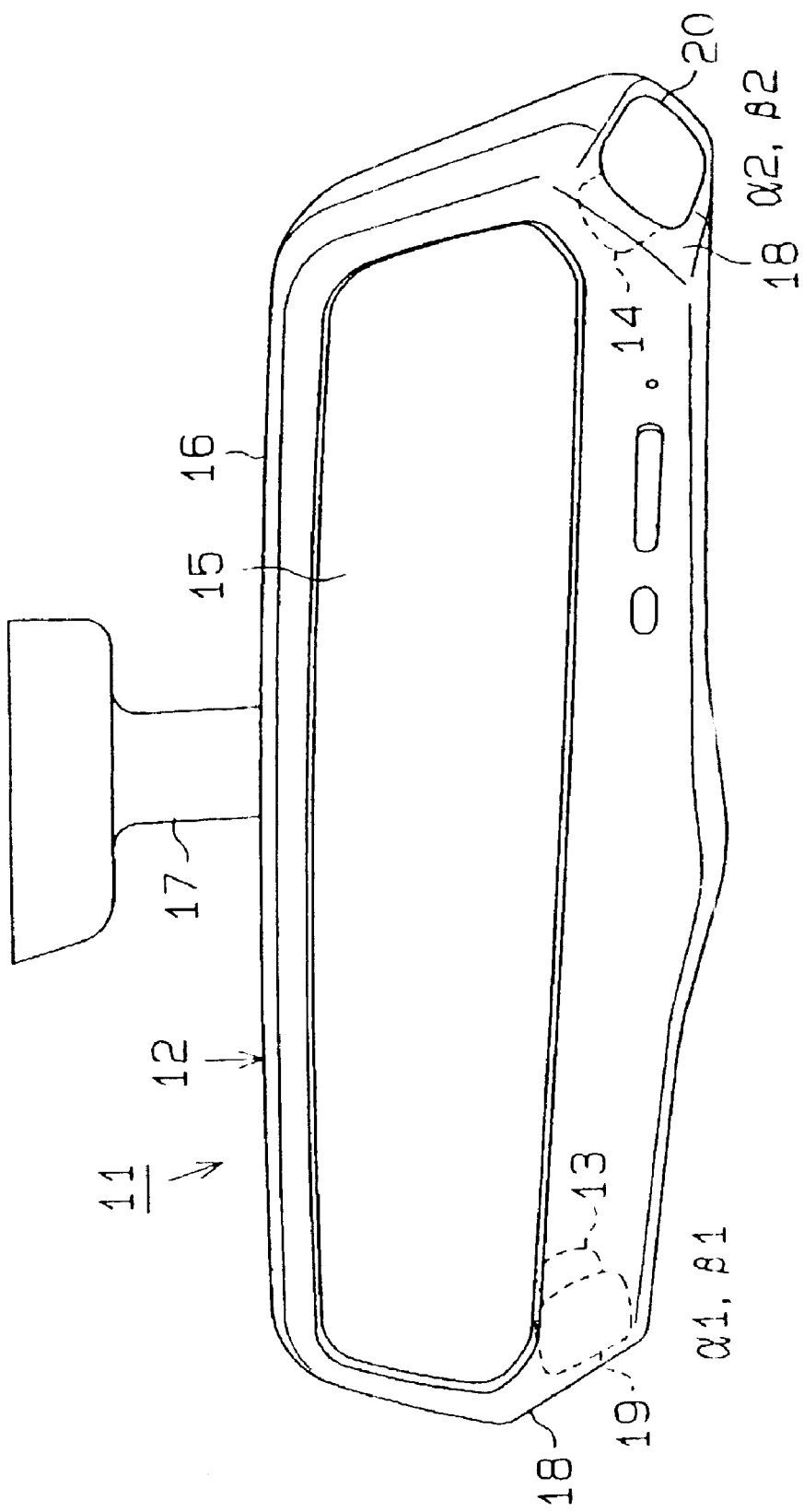
FIG. 1 is a schematic perspective view showing a passenger compartment monitoring apparatus according to a preferred embodiment of the present invention.

In the drawings, like numerals are used for like elements throughout.

FIG. 1 is a schematic perspective view showing a passenger compartment monitoring apparatus 11 according to a preferred embodiment of the present invention. As shown in FIG. 1, the monitoring apparatus 11 includes a left camera (first imaging device) 13 and a right camera (second imaging device) 14 that are incorporated in a room mirror 12.

The room mirror 12 is arranged between a driver seat and a passenger seat in the front position of the passenger compartment. The room mirror 12 includes a reflection mirror 15 and a case 16. The room mirror 12 is attached to a roof panel of the vehicle by means of a supporting arm 17. The case 16 and the supporting arm 17 are ball-jointed to each other to that the room mirror 12 is movable in a three dimensional manner in three axial directions with respect to the supporting arm 17.

The reflection mirror 15 and the case 16 are trapezoidal shape, and its bottom side is longer than its upper side. Each of the two lower corners of the case 16 is chamfered to form a diagonal surface 18. Each diagonal surface 18 faces a diagonally downward direction relative to a mirror surface of the reflection mirror 15. Thus, each diagonal surface 18 is faced toward either the driver seat or the passenger seat when the room mirror 12 is attached to the vehicle.

The left camera 13 and the right camera 14 are installed in the case 16. The left camera 13 is arranged in the left diagonal surface 18 and the right camera 14 is arranged in the right diagonal surface 18. An opening is formed in the left diagonal surface 18 and a lens 19 of the left camera 13 is received in the opening. A lens 20 of the right camera 14 is received in an opening formed in the right diagonal surface 18. In the preferred embodiment, the left camera 13 and the right camera 14 are CMOS cameras, which include CMOS imaging devices.

Figure 2:
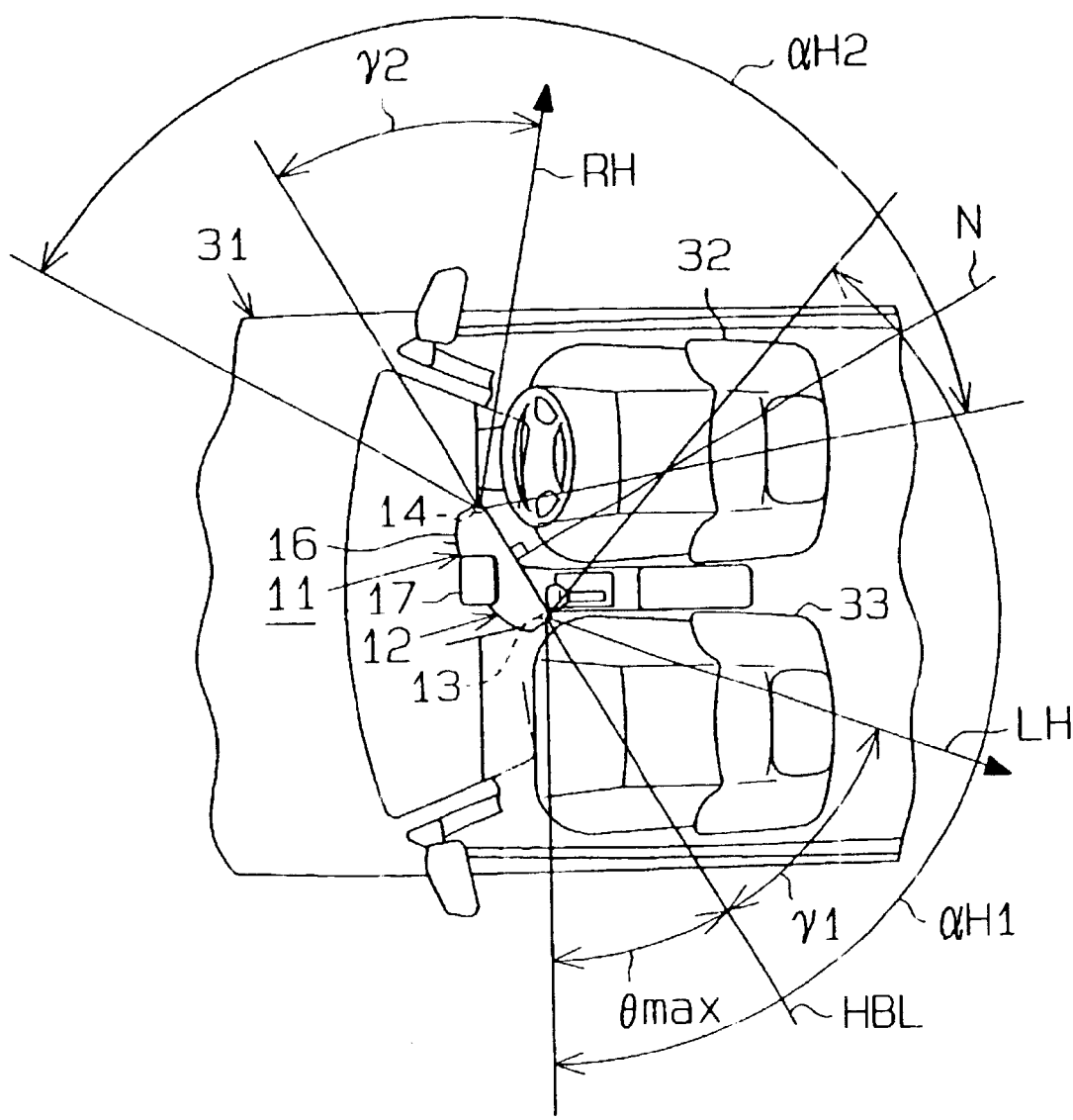
FIG. 2 is a schematic plan view showing a front portion of the passenger compartment where the monitoring apparatus of FIG. 1 is installed.
Figure 3:
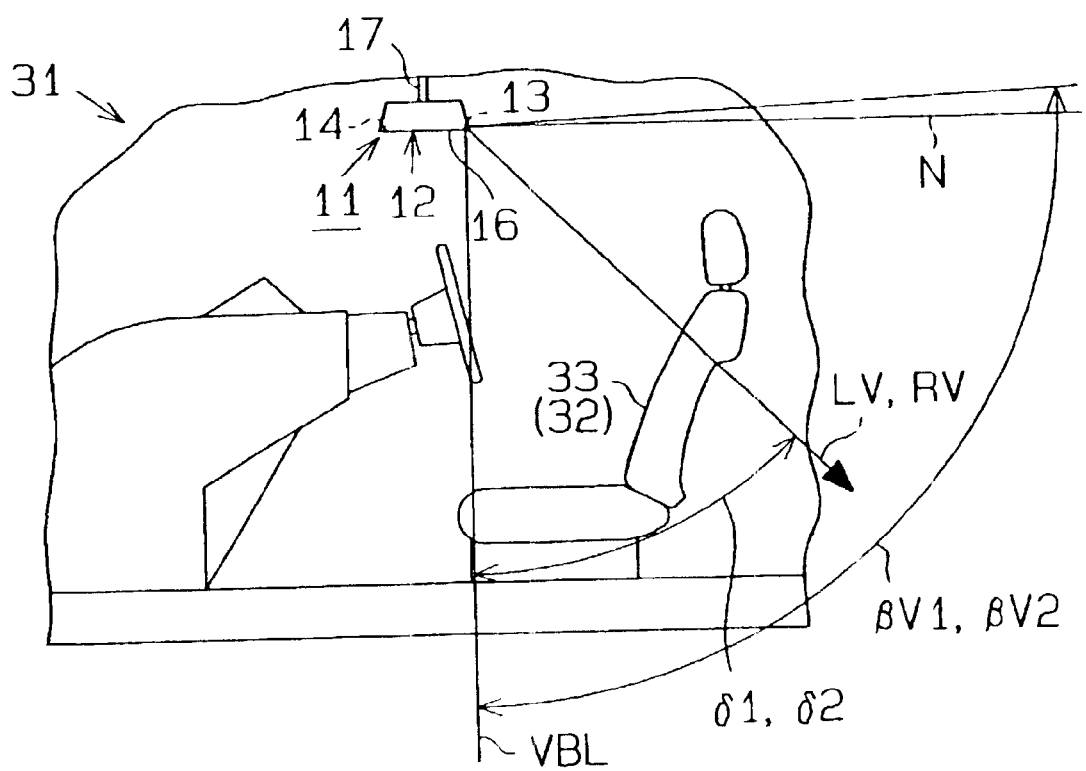
FIG. 3 is a schematic side view showing the front portion of the passenger compartment where the monitoring apparatus of FIG. 3 is installed.

FIG. 2 is a plan view showing a front portion of the passenger compartment where the room mirror 12 is arranged, and FIG. 3 is a side view of the front portion of the passenger compartment where the room mirror 12 is arranged.

As shown in FIG. 2, in the preferred embodiment, the monitoring apparatus 11 is installed in a right-hand drive vehicle 31 having a driver seat 32, a passenger seat 33, and a rear passenger seat (not shown).

The room mirror 12 is movable within a predetermined rotation angle θ toward the driver seat 32. In FIG. 2, the room mirror 12 is rotated by a maximum rotation angle θmax toward the driver seat 32.

FIG. 3 shows the room mirror 12 in a state that its mirror surface is perpendicular to a horizontal plane. Thus, a normal line N defined at the center of the reflection mirror 15 of the room mirror 12 lies along a horizontal plane of the vehicle.

The left camera 13 has first horizontal angle of view α1 and first vertical angle of view β1 with respect to the lens 19. The right camera 14 has second horizontal angle of view α2 and second vertical angle of view β2 with respect to the lens 20. The values of the horizontal angle of views α1, α2 and the vertical angle of views β1, β2 are easily obtained. In FIG. 2, when the angle of views α1, α2 are projected on a horizontal plane, the angles are represented by αH1, αH2.

As shown in FIG. 2, the left camera 13 is attached to the room mirror 12 so that it faces the left side of the vehicle 31. The horizontal mounting angle (first horizontal mounting angle) γ1 of the left camera 13 is obtained by a following equation. The horizontal mounting angle γ1 is formed by a line LH that is obtained when an optical axis of the left camera 13 is projected on the horizontal plane and a horizontal reference line HBL that is vertical to the normal line N and extends in left and right directions of the vehicle.

horizontal mounting angle γ1=horizontal angle of view α1/2−
maximum rotation angle θmax    equation (1)

The right camera 14 is arranged in the room mirror 12 to face the right side of the vehicle 31. A horizontal mounting angle (a second horizontal mounting angle) γ2 of the right camera 14 is obtained from equation (1). The horizontal mounting angle γ2 is formed by a line RH that is obtained when an optical axis of the right camera 14 is projected on the horizontal plane, the normal line N, and the horizontal reference line HBL.

The horizontal angle of views α1, α2 of the left camera 13 and the right camera 14 are set so that the imaging area of the left camera 13 and the imaging area of the right camera 14 overlap at a predetermined distance from the room mirror 12 and so that a blind spot is not formed between the imaging area of the left camera 13 and the imaging area of the right camera 14. In the preferred embodiment, the horizontal angle of views α1, α2 of the left camera 13 and the right camera 14 are set so that the imaging area of the left camera 13 and the imaging area of the right camera 14 overlap at a position where the cameras can monitor at least a driver who is seated on the driver seat.

Referring to FIG. 3, a vertical mounting angle (a first vertical mounting angle) δ1 of the left camera 13 is obtained by the following equation. The vertical mounting angle δ1 is formed by a line LV that is obtained when an optical axis of the left camera 13 is projected on the vertical plane of the vehicle and a line that is vertical to the normal line N and extends downward.

vertical mounting angle δ1=vertical angle of view β1/2 equation (2)

In the same manner, a vertical mounting angle (a second vertical mounting angle) δ2 of the right camera 14 is obtained from equation (2). The vertical mounting angle δ2 is formed by a line that is obtained when an optical axis of the right camera 14 is projected on the vertical plane and a line that is vertical to the normal line N and extends downward. In FIG. 3, the vertical angle of views β1, β2 projected on the vertical plane by βV1, βV2.

In this embodiment, the angle of view α1 of the left camera 13 and the angle of view α2 of the right camera 14 are the same and the angle of view β1 of the left camera 13 and the angle of view β2 of the right camera 14 are the same. For example, the horizontal angle of views α1, α2 are 125 degrees, the vertical angle of views β1, β2 are 95 degrees, the maximum angle θmax of the room mirror 12 is 30 degrees. Therefore, the horizontal mounting angles γ1, γ2 that are 32.5 degrees are obtained from equation (1), and the vertical mounting angles δ1, δ2 that are 47.5 degrees are obtained from equation (2).

In the preferred embodiment, the surface of the reflection mirror 15 is flat. Thus, when the mirror surface of the reflection mirror lies along a vertical plane, the normal line N of the mirror surface lies on the horizontal plane. Therefore, the horizontal mounting angle γ and the vertical mounting angle δ are each the inclination angle relative to the mirror surface of the reflection mirror 15. More specifically, the horizontal mounting angle γ is an angle obtained from the horizontal reference line HBL extending in left and right directions along the mirror surface of the reflection mirror 15. The vertical mounting angle δ is an angle obtained from the vertical reference line VBL extending vertically along the mirror surface of the reflection mirror 15.

In the vehicle 31, a computer analyzes the image data obtained by the monitoring apparatus 11. In accordance with the analysis result, for example, ignition devices for operating the driver seat, passenger seat, or side air bags are not operated under certain predetermined conditions. In such case, a warning lamp or a warning device is operated.

Next, an operation of the monitoring apparatus 11 for monitoring the passenger compartment will be explained.

When the room mirror 12 is arranged in a right-hand drive vehicle, the passenger compartment is monitored by the cameras 13 and 14, as shown in FIGS. 2 and 3.

As shown in FIGS. 2 and 3, even when the room mirror 12 is not faced downward, the passenger compartment below the room mirror 12 is monitored by the left camera 13 and the right camera 14. Even when the room mirror 12 faces the driver seat side and is rotated around the vertical axis by the maximum rotation angle θmax, the left camera 13 monitors the rear of the passenger seat 33. The imaging areas of the left camera 13 and the right camera 14 are overlapped at where the driver is sitting on the driver seat. Thus, the left camera 13 and the right camera 14 monitor the driver seat 32 and the rear seat. In this manner, the left camera 13 and the right camera 14 monitor practically the entire passenger compartment.

A driver inclines the room mirror 12 downward. Thus, in addition to the passenger seat, the section of the vehicle in front of the left camera 13 at the passenger seat side is monitored by the left camera 13.

For example, when a child seat is mounted on the passenger seat, the child seat is recognized when the monitoring apparatus 11 analyzes the image data of the passenger compartment. The monitoring apparatus 11 then transmits a predetermined signal to prohibit ignition of a passenger seat air bag igniter and a passenger seat side air bag igniter. In the same manner, when a child seat is arranged on the rear seat and the image data obtained by the monitoring apparatus 11 is analyzed, the monitoring apparatus 11 prohibits ignition of a corresponding side air igniter.

For example, the ignition of an air bag igniter may be prohibited when the monitoring apparatus 11 recognizes that the posture of a passenger sitting on a seat is improper. In this state, a warning lamp corresponding to the seat goes on and a warning sound is generated. When the monitoring apparatus 11 determines that the passenger is seated in a proper manner, the monitoring apparatus 11 permits the ignition of the igniter, turns off the warning lamp, and stops the warning sound.

When the monitoring apparatus 11 is installed in a left-hand drive vehicle, the room mirror 12 is rotated around a vertical axis so as to face the driver seat, which is located on the left side of the vehicle. The right camera 14 monitors the passenger seat. Even when the room mirror 12 is not inclined downward, the passenger compartment below the room mirror 12 is monitored. Even when the room mirror 12 is rotated by the maximum rotation angle θmax toward the driver seat side, the right camera 14 monitors the rear of the passenger seat side of the vehicle. The left camera 13 and the right camera 14, which have an overlapped imaging area, monitors the driver seat side and the rear seat. Thus, practically the entire area of the passenger compartment is monitored.

The driver inclines the room mirror 12 downward. Thus, the section of the vehicle in front of the right camera 14 at the passenger seat side is monitored by the right camera 14. The monitoring apparatus 11 analyzes image data to prohibit operation of an air bag igniter when a child seat is being used or when a passenger is seated improperly. In such state, a warning lamp goes on and a warning sound is generated.

When the left camera 13 is installed in the room mirror 12, the normal line N of the room mirror 12 lies on the horizontal line N, and the left camera 13 is rotated on the horizontal plane so that the optical axis of the left camera 13 is rotated from the horizontal reference line HBL by the horizontal mounting angle γ1. Next, the left camera 13 is rotated along a horizontal plane so that the optical axis of the left camera 13 is rotated from the vertical reference line VBL by the vertical mounting angle δ1.

When the right camera 14 is arranged in the room mirror 12, the right camera 14 is rotated on the horizontal plane so that the optical axis of the right camera 14 is rotated from the horizontal reference line HBL by the horizontal mounting angle γ2 in a state in which the normal line N of the room mirror 12 lies along a horizontal plane. Next, the right camera 14 is rotated along a vertical plane so that the optical axis of the right camera 14 is rotated from the vertical reference line VBL by the vertical mounting angle δ2.

A conventional monitoring apparatus monitors a passenger compartment with a room mirror facing a certain direction, such as toward the driver seat. However, the room mirror is not always faced toward the driver. If a passenger moves the room mirror for one reason or another, part of the passenger compartment may not be monitored.

However, the monitoring apparatus 11 of the present invention monitors practically the entire passenger compartment in a condition that the room mirror 12 regardless of the direction the mirror 12 is facing. Moreover, even when the room mirror 12 is rotated toward the right or the left by the maximum rotation angle θmax, the monitoring apparatus 11 monitors practically the entire passenger compartment. Therefore, even if the room mirror 12 is moved for one reason or another, the predetermined monitoring area is imaged.

The monitoring apparatus 11 of this embodiment has following advantages.

(1) In the monitoring apparatus 11, the two cameras (left camera 13 and right camera 14) are installed in the room mirror 12 at a predetermined angle. Thus, the necessary monitoring area is guaranteed regardless of whether the monitoring apparatus 11 is installed in a right-hand drive vehicle or a left-hand drive vehicle. Therefore, the passenger compartment including the passenger seat side is monitored without any blind spots.

(2) The horizontal mounting angles γ1, γ2 and the vertical mounting angles δ1, δ2 are calculated through equations (1) and (2), which are simple, based on the horizontal angle of view α and the vertical angle of view β, which are easily obtained.

(3) The lenses 19, 20 are arranged on the diagonal surfaces 18 defined on the lower two ends of the case 16. This facilitates the monitoring of lower, left, and right directions. The monitoring of the passenger seat side is significantly facilitated.

(4) The left camera 13 and the right camera 14 are installed in the room mirror 12 in the monitoring apparatus 11. Therefore, the monitoring apparatus may be manufactured without changing the design of the vehicle body. Further, the monitoring apparatus may be formed by making changes to the room mirror whenever necessary.

It should be apparent to those skilled in the art that the present invention may be embodied in many other specific forms without departing from the spirit or scope of the invention. Particularly, it should be understood that the invention may be embodied in the following forms.

The horizontal angle of views α1, α2 and the vertical angle of views β1, β2 of the cameras 13, 14 is not limited. However, it is preferred that the vertical angle of views β1, β2 be greater than or equal to 90 degrees.

The imaging areas of the horizontal angle of views α1, α2 of the cameras 13, 14 do not have to be overlapped with each other as long as the passenger compartment can be monitored by the cameras 13, 14.

The horizontal angle of views α1, α2 do not have to be the same. Further, the vertical angle of views β1, β2 do not have to be the same.

Image data obtained by the cameras may be stored so that in case of any accident, the state of the passenger compartment when the accident occurred may be investigated later.

Switches of various devices in the vehicle may go on and off in accordance with the image data generated by the camera.

Image data generated by the camera may be shown on a display of a car navigation system so that a driver can check the passenger compartment.

The monitoring apparatus 11 may be used for security when the vehicle is parked.

The maximum rotation angle θmax of the room mirror 12 is not limited.

The mirror surface of the reflection mirror 15 may be curved.

The reflection mirror 15 and the case 16 may be triangular. In this case, the cameras are arranged on the left and right diagonal sides.

The cameras may be arranged on the rear side of the half mirror of the reflection mirror 15. In this case, the cameras monitor the passenger compartment through the half mirror.

The cameras may be CCD cameras.

The cameras may be arranged at the center of the case 16 or may be arranged one above the other.

Three cameras or more may be arranged in the room mirror 12.

Furthermore, a camera may be arranged at the lower middle portion of the case 16 to detect when the driver dozes off while driving.

The monitoring apparatus 11 may be arranged in a vehicle having only a driver seat and a passenger seat.

Therefore, the present examples and embodiments are to be considered as illustrative and not restrictive and the invention is not to be limited to the details given herein, but may be modified within the scope and equivalence of the appended claims.

What is claimed is:

1. A passenger compartment monitoring apparatus comprising:

a room mirror arranged in a passenger compartment; and a plurality of imaging devices arranged in the room mirror, wherein each of the imaging devices is arranged at a predetermined angle with respect to the room mirror so as to monitor a predetermined area of the passenger compartment when arranged in either one of a right-hand drive vehicle or a left-hand drive vehicle.

2. The monitoring apparatus according to claim 1, wherein the room mirror includes a reflection mirror and a case for accommodating the reflection mirror, and wherein the imaging devices are arranged on two lower ends of the case.

3. The monitoring apparatus according to claim 1, wherein each of the imaging devices is a CMOS camera including a CMOS imaging device.

4. The monitoring apparatus according to claim 1, wherein:

the room mirror is rotatable;

the imaging devices includes first and second imaging devices, wherein the first imaging device has a first horizontal angle of view and a first vertical angle of view and the second imaging device has a second horizontal angle of view and a second vertical angle of view;

when the room mirror is arranged so that a normal line with respect to a mirror surface of the room mirror lies on a horizontal plane of the vehicle, the first imaging device has a first horizontal mounting angle that is formed by a first horizontal projection optical axis obtained by projecting an optical axis of the first imaging device on the horizontal plane and a horizontal reference line that is vertical to the normal line on the horizontal plane, the first horizontal mounting angle being set by subtracting a maximum rotation angle of the room mirror that faces a driver seat from half of the first horizontal angle of view:

the second imaging device has a second horizontal mounting angle that is formed by a second horizontal projection optical axis obtained by projecting an optical axis of the second imaging device on the horizontal plane, and the horizontal reference line and the second horizontal mounting angle is set by subtracting the maximum rotation angle from half of the second horizontal angle of view;

the first imaging device has a vertical mounting angle formed by a first vertical projection optical axis obtained by projecting the optical axis on the vertical plane and a vertical reference line that is vertical to the normal line on the vertical plane, and the first vertical mounting angle is set to half of the first vertical angle of view; and the second imaging device has a second vertical mounting angle formed by a second vertical projection optical axis obtained by projecting the optical axis on the vertical plane and the vertical reference line, and the second vertical mounting angle is set to half of the second vertical angle of view.

5. The monitoring apparatus according to claim 4, wherein the first and second horizontal angle of views are set so that imaging areas of the first and second imaging devices are overlapped with each other at a predetermined distance from the room mirror.

6. The monitoring apparatus according to claim 4, wherein:

the first horizontal angle of view is substantially equal to the second horizontal angle of view;

the first vertical angle of view is substantially equal to the second vertical angle of view;

the first horizontal mounting angle is substantially equal to the second horizontal mounting angle; and the first vertical mounting angle is substantially equal to the second vertical mounting angle.

7. The monitoring apparatus according to claim 4, wherein the room mirror includes a reflection mirror and a case for accommodating the reflection mirror, and wherein the first and second imaging devices are arranged on two lower ends of the case.

8. The monitoring apparatus according to claim 4, wherein each of the first and second imaging devices is a CMOS camera including a CMOS imaging device.

9. The monitoring apparatus according to claim 4, wherein each of the first and second vertical angle of views is set to 90 degrees or more.

10. A passenger compartment monitoring apparatus comprising:

a rotatable room mirror arranged in a passenger compartment;

first and second imaging devices arranged on the room mirror, wherein the first imaging device has a first horizontal angle of view and a first vertical angle of view and the second imaging device has a second horizontal angle of view and a second vertical angle of view;

wherein when the room mirror is arranged so that a normal line with respect to the room mirror lies on a horizontal plane of the vehicle;

the first imaging device has a first horizontal mounting angle formed by a first horizontal projection optical axis that is obtained by projecting an optical axis of the first imaging device on the horizontal plane and a horizontal reference line that is vertical to the normal line on the horizontal plane, and the first horizontal mounting angle is set based on the first horizontal angle of view and a rotation angle of the room mirror that faces a driver seat;

the second imaging device has a second horizontal mounting angle formed by a second horizontal projection optical axis obtained by projecting an optical axis of the second imaging device on the horizontal plane and the horizontal reference line and the second horizontal mounting angle is set based on the second horizontal angle of view and the rotation angle;

the first imaging device has a first vertical mounting angle formed by a first vertical projection optical axis obtained by projecting the optical axis on the vertical plane and a vertical reference line that is vertical to the normal line on the vertical plane, and the first vertical mounting angle is set based on the first vertical angle of view;

the second imaging device has a second vertical mounting angle formed by a second vertical projection optical axis obtained by projecting the optical axis on the vertical plane and the vertical reference line, and the second vertical mounting angle is set based on the second vertical angle of view; and wherein the first and second horizontal angle of views are set so that imaging areas of the first and second imaging devices are overlapped with each other at a predetermined distance from the room mirror.

11. The monitoring apparatus according to claim 10, wherein:

the first horizontal mounting angle is set by subtracting a maximum rotation angle of the room mirror that faces the driver seat from a half of the first horizontal angle of view;

the second horizontal mounting angle is set by subtracting the maximum rotation angle from a half of the second horizontal angle of view;

the first vertical mounting angle is set to half of the first vertical angle of view, and the second vertical mounting angle is set to half of the second vertical angle of view.

12. The monitoring apparatus according to claim 11, wherein the first horizontal angle of view is substantially equal to the second horizontal angle of view, and the first vertical angle of view is substantially equal to the second vertical angle of view.

13. The monitoring apparatus according to claim 11, wherein:

the first horizontal mounting angle is substantially equal to the second horizontal mounting angle; and the first vertical mounting angle is substantially equal to the second vertical mounting angle.

14. The monitoring apparatus according to claim 11, wherein:

the first horizontal angle of view is substantially equal to the second horizontal angle of view;

the first vertical angle of view is substantially equal to the second vertical angle of view;

the first horizontal mounting angle is substantially equal to the second horizontal mounting angle; and the first vertical mounting angle is substantially equal to the second vertical mounting angle.

15. The monitoring apparatus according to claim 11, wherein each of the first and second vertical angle of views is set to 90 degrees or more.

16. The monitoring apparatus according to claim 11, wherein the room mirror includes a reflection mirror and a case for accommodating the reflection mirror, and the imaging devices are arranged on two lower ends of the case.

* * * * *